United States Patent [19]

Ruegg

[11] Patent Number: 5,771,820
[45] Date of Patent: Jun. 30, 1998

[54] METHOD FOR THE THERMAL TREATMENT OF WASTE MATERIAL, PARTICULARLY REFUSE, AND A ROTARY TUBULAR FURNACE FOR APPLYING THE METHOD

[75] Inventor: Hans Ruegg, Wohlen, Switzerland

[73] Assignee: Von Roll Umwelttechnik AG, Zurich, Switzerland

[21] Appl. No.: 535,907

[22] Filed: Sep. 28, 1995

[30] Foreign Application Priority Data

Sep. 29, 1994 [CH] Switzerland .......................... 02946/94

[51] Int. Cl.[6] .................................................... F23G 5/20
[52] U.S. Cl. ...................... 110/346; 110/246; 432/105; 432/114
[58] Field of Search ................... 110/346, 226, 110/246; 432/105, 106, 114, 117, 119

[56] References Cited

U.S. PATENT DOCUMENTS

| | | | |
|---|---|---|---|
| 2,274,780 | 3/1942 | Duerr et al. | 110/246 X |
| 4,961,391 | 10/1990 | Mak et al. | 110/246 X |
| 5,005,493 | 4/1991 | Gitman | 110/246 |
| 5,031,549 | 7/1991 | Collins, Jr. et al. | 110/346 |

FOREIGN PATENT DOCUMENTS 2702-266  7/1978  Germany ............................... 110/226

*Primary Examiner*—Henry A. Bennett
*Assistant Examiner*—Susanne C. Tinker
*Attorney, Agent, or Firm*—Oblon, Spivak, McClelland, Maier & Neustadt, P.C.

[57] ABSTRACT

A waste material, particularly refuse, is conveyed through a combustion chamber while simultaneously being mixed and is treated with a gaseous oxidizing agent. The combustion chamber comprises a rotary tubular furnace. The waste material is acted on by the gaseous oxidizing agent, with the volatile combustible constituents of the waste material forming flames with the oxidizing agent. The radiation heat of the flames frees additional volatile constituents of the waste material. The waste material freed of volatile constituents is obtained as refuse coke and the unburnt volatile constituents are obtained as combustible gas. The thermal treatment in the rotary tubular furnace can be continued beyond the freeing of volatile substances. Given an adequate temperature rise, the oxidic constituents of the slag formed are melted, and the latter can be obtained in the form of glass.

21 Claims, 2 Drawing Sheets

METHOD FOR THE THERMAL TREATMENT OF WASTE MATERIAL, PARTICULARLY REFUSE, AND A ROTARY TUBULAR FURNACE FOR APPLYING THE METHOD

BACKGROUND OF THE INVENTION

1. Field of the Invention

The present invention relates to a method for the thermal treatment of waste material, particularly refuse, and to an apparatus for applying the method.

2. Discussion of the Related Art

In the incineration of waste material, particularly domestic refuse, use is predominantly made of grate furnaces. In this case the refuse is conveyed through a combustion chamber, dried and incinerated on a combustion grate with the aid of movable grate blocks. The oxidizing agent used is air, which flows through the combustion grate, and through the waste situated on it, from bottom to top. The fraction of the waste which has reached ignition temperature is ignited, and the flue gases thus freed are conveyed into a secondary combustion chamber, in which secondary air is added to effect the complete combustion of the flue gases. By means Of these methods of incineration all organic constituents of the refuse are in the ideal case converted into carbon dioxide and water. The slag formed after the incineration is cooled and transported to a slag dump or for further processing. After the secondary combustion, the flue gases are generally passed through a heat exchanger, in which the heat produced is partly recovered, before they are passed on for cleaning in units connected downstream.

The above-described conventional type of refuse incineration has certain disadvantages. The complete combustion with air as oxidizing agent produces an approximately 5000 to 6000 cubic meters of flue gas per ton of refuse. This amount of flue gas must be subjected to expensive cleaning to enable it to be emitted into the atmosphere. The units effecting the cleaning of flue gas and the recovery of heat must be designed accordingly. They are subject to government checks. Investment for such plants is therefore correspondingly high.

Another disadvantage of this method consists in that dust and only partly burnt particles of soot and ash are whirled up and entrained by the flue gases into the units connected downstream when air flows through the combustion grate and the layer of waste. They are deposited there, and this leads to problems, particularly in the recovery of heat. The deposits in the heat exchanger connected downstream impair the transfer of heat and give rise to corrosion on the heat exchanger surfaces, thus reducing the thermal efficiency of the plant and leading to expensive inspection work.

Because of the materials of which the grate blocks are made, the combustion temperatures cannot be selected at will. The achievable residence time of the waste in the combustion chamber is also limited and is dependent on the overall size of the combustion grate. This has a negative effect on the quality of the slag. For this reason complete combustion of the waste is not ensured. In addition, elutable inorganic noxious substances are always retained in the slag, and these subsequently make its further use or dumping impossible or at least very difficult.

In order to solve these problems in the above-mentioned refuse incineration method, various alternative methods have been developed, which however still have considerable disadvantages.

In order to raise the combustion temperature and to reduce the amount of flue gas, and thus also to reduce the size and investment costs of the units connected downstream, the air for combustion flowing through the combustion grate was enriched with oxygen. This method, however, leads to unacceptable temperatures on the combustion grate. A relevant reduction of the amount of flue gas thus cannot be achieved, and the thermal and mechanical loading of the grate is increased.

In addition to refuse incineration, another thermal method of energy generation from waste is known, namely degasification, also called pyrolysis, low temperature carbonization or coking (see in this connection the technical journal "Müll und Abfall" December 1978).

In all methods based on degasification the waste is heated with the exclusion of oxygen. In this case the organic compounds in the waste become unstable; the volatile constituents escape and the non-volatile fractions are converted into coke.

Because the degasification is effected with the exclusion of oxygen, in methods known hitherto the energy necessary for the endothermic process is supplied to the waste via heating surfaces which must be in direct contact with the waste. Such heating surfaces are formed either by furnace walls heated from the outside or by heating tubes situated in the furnace. Because of the poor thermal conduction of the waste, pretreatment and comminution of the waste before the actual degasification process are essential. On account of the contact between the abrasive refuse and the heating surfaces, the mechanical parts need expensive servicing.

Other known thermal methods are based on the melting-down of the waste, combined with degasification or gasification. In these methods, use is made practically exclusively of shaft furnaces as the main unit, such as are known from the production of pig iron. From the production of iron it is however known that a shaft furnace can be operated without problems only if a homogeneous structure of the material to be melted down is ensured. A heterogeneous fuel such as domestic refuse has no such homogeneous structure even after pretreatment. This leads to bridging in the shaft furnace and to the formation of large agglomerates. The surface of solids which is necessary for the reaction between gas and solids thus decreases, and the oxidation of the organic constituents is not ensured. This has the consequence that organic constituents which have not been burnt up are enclosed in the molten material and thus can no longer be oxidized. Fractures, in which the unoxidized constituents appear, occur on the subsequent cooling and granulation of the molten material. The production of an inert slag is not ensured.

SUMMARY OF THE INVENTION

An object of the present invention is to provide for a method and apparatus of the type initially mentioned above, in which the disadvantages referred to above are eliminated and the amount of flue gases is considerably reduced.

The invention has the considerable advantage over the known method in that the waste material, particularly refuse, can be subjected to the thermal treatment without any pretreatment such as comminution or the like, while the amount of flue gases produced is advantageously reduced at least to half. The unburnt volatile constituents escape because of the high temperatures and the homogeneous heating of the layer of waste. They are completely drawn off and can be passed on for secondary combustion or used as fuel in other processes. Because the oxidizing agent is introduced above the layer of waste, the disadvantages, such as the whirling-up of dust and the like, are avoided.

Since only degasification takes place instead of complete combustion in the rotary tubular furnace, and since the temperature during this degasification process is regulated by the amount of gaseous oxidizing agent, the thermal loading on the plant can be kept low.

Oxygen is preferably used as gaseous oxidizing agent. Instead of oxygen, flue gases which are enriched with and contain at least 50% oxygen can be fed back to the rotary tubular furnace as an oxidizing agent. The heat produced on the combustion of the combustible volatile substances is passed directly by heat radiation, in this case gas radiation, onto the waste materials contained in the furnace and on the other hand transmitted to the rotary tubular furnace wall, from where it heats the waste materials by direct contact.

The method according to the invention, with direct heating of the waste material by heat radiation, has great advantages over conventional pyrolysis methods in which the heat is passed to the waste material through a wall. With the method according to the invention, heating is possible up to wall temperatures of around 1200° C., whereas in known pyrolysis methods with indirect heating it is necessary, for technical reasons in respect of material, to make do with a wall temperature below 650° C. The high temperatures applied in the method of the invention improve the transfer of heat from the flames to the wall of the rotary tubular furnace, and the waste materials are thus more intensively heated by the direct contact. By this means faster heating-up is achieved, thus making it possible to work with smaller rotary tubular furnaces. In addition, the problems of sealing between the heating gas chamber and the atmosphere, and also between the heating gas chamber and the interior of a pyrolysis drum, such as occur with conventional rotary tubular furnaces, are eliminated because there is no heating gas chamber.

Through the supply of additional gaseous oxidizing agent in a downstream stage, further fractions of the combustible material, whether volatile or solid, still present in the waste material can be burnt. The temperature in this stage is thereby further raised and the remaining, mainly oxidic constituents are converted into the molten phase. With this method of procedure the drying, degasification, combustion and melting of the solid combustion residues, that is to say the conversion of the waste material into an inert, reutilizable product, are effected in succession in the rotary tubular furnace.

Accordingly, the present invention relates to a method for a thermal treatment of waste material which comprises the steps of conveying and mixing a waste material through a combustion chamber which is in the form of a rotary drum of a rotary tubular furnace; feeding a gaseous oxidizing agent to the combustion chamber so as to act on the waste material along the rotary tubular furnace, wherein, above the waste material, the gaseous oxidizing agent and volatile combustible constituents of the waste material form flames whose heat effects a liberation of additional volatile constituents of the waste material; and obtaining the waste material freed of the volatile constituents as refuse coke, and unburnt volatile constituents as combustible gas.

The present invention also relates to an apparatus for the thermal treatment of waste material. The apparatus comprises a rotary tubular furnace including a rotary drum; and a tubular lance arranged in the rotary drum, so as to project from an end face into the rotary drum. The tubular lance comprises outlet apertures for oxidizing agent. The outlet apertures are distributed over a length of the tubular lance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
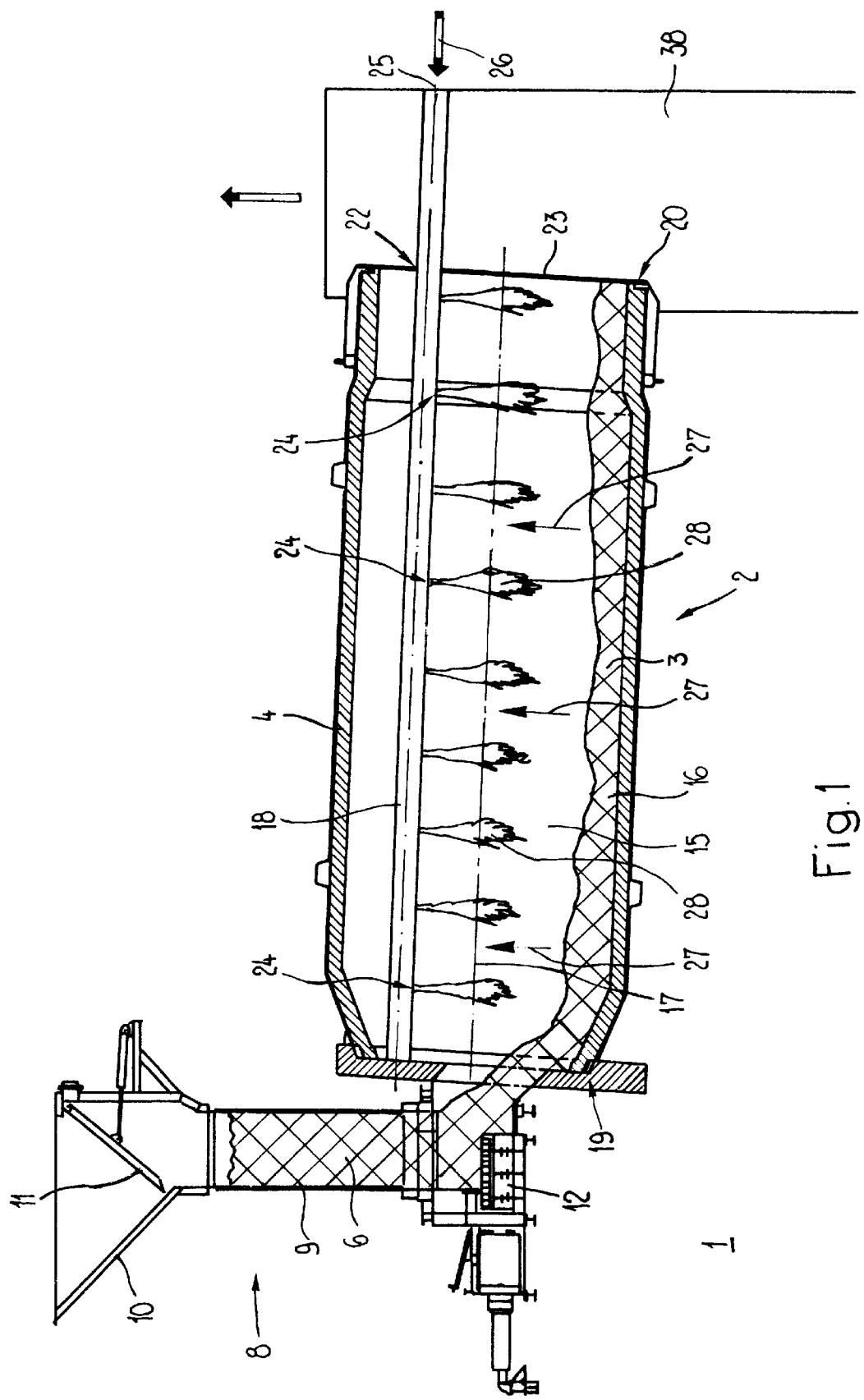
FIG. 1 shows a first embodiment of a rotary tubular furnace.

Referring now to the drawings wherein like reference numerals designate identical or corresponding parts throughout the several views, in FIG. 1, a rotary tubular furnace 1 having a slightly inclined rotary drum 2 is shown. The inclination relative to the horizontal amounts to from 3° to 7°, preferably approximately 5°. The rotary drum 2 has an inner wall 3 provided with a refractory lining and insulated and an outer jacket 4 of steel. Waste material 6 to be treated, which may be domestic refuse, industrial waste or the like, is introduced in its original form, that is to say without comminution, into a filling device 8 which on the input side to the rotary drum 2 in the vertical direction is fastened to the furnace body (not further shown). The filling device 8 includes, in this case, a tubular shaft 9 of uniform diameter and a filling hopper 10, in which a mechanically movable flap 11 is rotatably arranged. Other filling devices are also possible. The flap 11 seals the furnace relative to the atmosphere. Provided at the bottom end of the shaft 9 is a horizontally movable metering ram 12, by means of which the waste material 6 is delivered in batches into a combustion chamber 15 of the rotary drum 2. The waste material 16 introduced into the combustion chamber 15 is conveyed forward by the continuous rotary movement of the rotary drum 2 and at the same time is rearranged and mixed. As can be seen, the rotary drum 2 is filled with waste material 16 only in the bottom region.

Above the longitudinal axis 17 of the rotary drum 2 a tube 18, referred to as a lance, projects into the rotary drum 2 at the right-hand end face 20. This tubular lance 18 is advantageously cooled (not illustrated here) and extends over the entire length of the rotary drum 2; it is connected in a fixed position to a furnace body (not further shown) on the left-hand end face 19 (viewed in FIG. 1) of the rotary drum 2. The right-hand end of the rotary drum 2 projects into a chamber 38, through which the flue gases are passed into the units connected downstream. The lance 18 is fastened to the right-hand rear wall of the chamber 38. The treated residues drop out of the rotary drum into the next treatment stage, for example a melting furnace, disposed thereunder. Over its entire length the tubular lance 13 has downwardly pointing radial bores or nozzle openings 24 which are arranged at regular intervals and through which an oxidizing agent, indicated by the arrow 26 flows out in the direction of the waste material 16 from a free, open end 25 on the right-hand side (viewed in the figure) of the tubular lance 18.

Volatile constituents or gases escape from the continuously mixed waste material 16, as indicated by the arrows 27, and together with the oxidizing agents 26 form flames 28 at the radial bores or nozzle openings 24.

Figure 2:
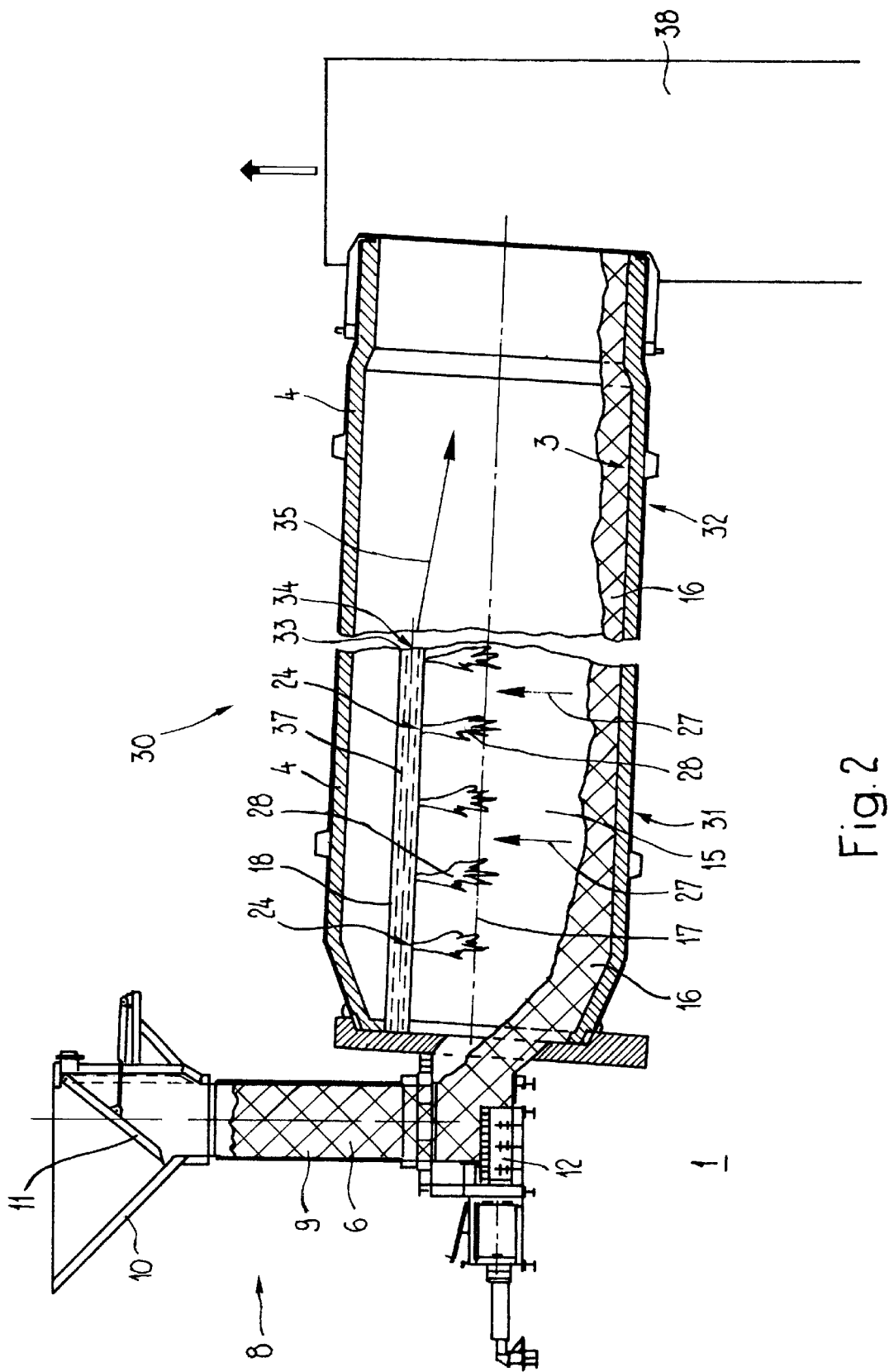
FIG. 2 shows a second embodiment of a rotary tubular furnace.

FIG. 2 shows a variant of this rotary tubular furnace 1, in which the rotary drum 30 is substantially longer than the rotary drum 2 in FIG. 1. This length preferably amounts to twice the length of the rotary drum 2. The rotary drum 30 is divided into a first part 31, in which the actual degasification takes place, and a second part 32 in which secondary combustion takes place. The tubular lance 18 here extends only as far as the first part 31 of the rotary drum 30 and has an open end 33 which opens into the second part 32 and in which an opening 34 is provided in its end face. The oxidizing agent 26 is in this case introduced into the lance 18 from the left (viewed in FIG. 2), although this is not further illustrated. The oxidizing agent flowing out of the open end 33 and indicated by the arrow 35 acts on the waste material 16 in the second part 32 of the rotary drum 2. It may be the same as the oxidizing agent 26 introduced and flowing out of the radial bores or nozzle openings 24, or else a different agent. In the latter case the tubular lance 18 has an additional tube 37, indicated by dashed lines, which extends as far as the open end 33 and through which the other oxidizing agent is then introduced into the second part 32.

Instead of uniform radial bores or nozzle openings 24 in the tubular lance 18, individually controllable nozzles may also be provided in the tubular lance 18. By means of these nozzles the supply of oxidizing agent 26 can be adjusted over the length of the rotary drum 2 (FIG. 1) or of the first part 31 of the rotary drum 30 (FIG. 2) in order to control the temperature distribution in the waste material 16 introduced.

The method for the thermal treatment of the waste material is now carried out in accordance with the following process (this applies both to the rotary tubular furnace 2 in FIG. 1 and to the rotary tubular furnace 30 in FIG. 2).

The waste material 6 is introduced into the filling device 8, without being comminuted, up to a predetermined filling level. By means of the metering ram 12 the waste material is then pushed quasi-continuously into the combustion chamber 15 of the rotary tubular furnace 1. The same amount of waste material 16 is thereby delivered by each forward stroke. The rate of feed of the metering ram 12 can be controlled continuously variably in order to permit adaptation to the amount of waste material 6 filled into the shaft 9. The waste material 16 thus continuously introduced into the rotary drum 2 or into the rotary drum 30 is conveyed forward by the continuous rotary movement and at the same time rearranged and mixed.

The volatile constituents or gases 27 continuously escaping from the waste material 16 then form, with the oxidizing agent 26, flames 28 at the radial bores or nozzle openings 24, whereby the heat necessary for the drying and degasification of the waste material 16 is freed. The heat freed is directed by gas radiation on the one hand to the waste material 16 introduced and on the other hand to the inner wall 3, from which it is likewise transmitted onto the waste material 16 indirectly by emitted radiation and by direct contact. On the one hand the temperature of the waste material 16 and on the other hand the wall temperature of the inner wall 3 are thereby raised. Thus, higher temperatures can be reached in the stratified waste material 16 without shortening the life of the rotary tubular furnace 1. Through the very high rate of combustion of the flames 28 any diffusion of the oxidizing agent 26 into the waste material 16 is prevented, and thus clean, complete degasification is ensured. The amount of the gaseous oxidizing agent is preferably controlled such that the flames 28 produced do not come into contact with the waste material 16 moved in the bottom region of the rotary drum 2.

The gaseous oxidizing agent 26 used is a gas having a high oxygen content, usually with an $O_2$ content above 50%, for example air or flue gas enriched with oxygen. However, oxygen alone may also be used. The temperature in the combustion chamber 15 is controlled by the rate of feed of the gaseous oxidizing agent 26. Because the oxidizing agent 26 is introduced fairly far above the waste material 16 introduced and under control by means of the radial bores or nozzle openings 24, no dust or other noxious substances of fine particle size are whirled up. Since the rotation continuously frees new surfaces of the waste material 16, the thermal radiation of the flames 28 and of the inner wall 3 of the rotary drum 2 (FIG. 1) or of the rotary drum 30 (FIG. 2) can heat up a larger amount of waste material 16 more quickly, so that a stable end state is reached substantially more quickly and, above all, comminution and pretreatment of the waste material 6 are eliminated. Moreover, the residence time and layer thickness of the waste material 16 in the rotary drums 2 or 30 can be varied by a variable speed of rotation of the rotary drum 2 or of the rotary drum 30. Furthermore, with individually controllable nozzles in the lance 18, the temperature distribution in the rotary drum 2 or 30 can be controlled.

The combustible volatile constituents or gases 27, which are not burnt, are drawn off in order, for example, to be passed on for secondary combustion. The waste material 16 freed of the volatile constituents 27 is obtained in the form of refuse coke. The combustible volatile constituents 27 which have not yet been burnt and the refuse coke can be put to further use as fuels which, in comparison with the waste material 16, are homogenized, in an external plant for energy generation (not illustrated here). The unburnt combustible volatile constituents 27 must however first be freed of dust and other noxious substances in a plant (not shown) and the refuse coke must first be freed of inert substances, before they can be passed on for external secondary combustion.

Since with the degasification described very little or no dust or other noxious substances of fine particle size are whirled up, less recleaning of the flue gases is required.

The secondary combustion can be carried out in the second part 32 of the rotary drum 30 in the rotary tubular furnace 1 of FIG. 2, or else in a plant connected downstream, for example in another rotary tubular furnace or in a fluidized bed furnace (not shown further here). The refuse coke can on the other hand be subjected to secondary combustion in the usual way on a combustion grate connected downstream (here not illustrated). Since an oxidizing agent 26 having a high oxygen content is preferably used, the amount of flue gas produced is reduced by up to 80%, and flue gases are obtained which contain up to 50% water vapor.

It is already known from the coal industry that it is advantageous to use such flue gases as gasification agents in order to remove carbon. The flue gases formed in the oxidation or combustion in the present thermal treatment method can therefore just as well be supplied to the refuse coke which is to be subjected to secondary combustion. However, the flue gases can also be enriched with oxygen and recycled as oxidizing agent 26 into the combustion chamber 15 via the tubular lance 18.

Through the additional feeding of oxidizing agent 35 into the second part 32 of the rotary drum 30 (FIG. 2) the combustion is continued and the temperature in the rotary drum 30 is additionally raised in relation to the first part 31, so that the slag produced is either sintered or fused into a glass-like state. The sintered or liquid glass thus obtained can then be drawn off in a known manner.

With the method described above it is possible to set in every region of the rotary tubular furnace 1 the temperature which is optimum and desired for the particular process cycle concerned. In addition, by appropriate feeding of oxidizing agents 26 and 35 it is possible to set in the rotary tubular furnace 1 the conditions which bring about a reduction of flue gases by up to 80% in comparison with conventional waste treatments. At the same time, almost complete inertization of the slag is achieved, so that the latter can either be put to further use or be dumped without environmental pollution.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for a thermal treatment of waste material, the method comprising the steps of:

conveying and mixing a waste material through a combustion chamber which is in the form of a rotary drum of a rotary tubular furnace;

feeding air enriched with oxygen in a radial direction of said rotary drum so as to act on the waste material along the rotary tubular furnace, wherein, above the waste material, the air enriched with oxygen and volatile combustible constituents of the waste material form flames the heat of which effects a liberation of additional volatile constituents of the waste material; and obtaining the waste material freed of the volatile constituents as refuse coke, and unburnt volatile constituents as combustible gas.

2. A method according to claim 1, wherein the waste material is acted on by the air enriched with oxygen over an entire length of the rotary drum of the rotary tubular furnace.

3. A method according to claim 1, comprising the further step of metering an amount of the air enriched with oxygen agent such that the flames do not come into contact with the waste material moved in a bottom region of the combustion chamber.

4. A method according to claim 1, wherein the feeding step comprises feeding the air enriched with oxygen in a metered manner over a length of the rotary drum of the rotary tubular furnace, and thereby locally controlling a temperature of distribution.

5. A method according to claim 1, wherein a wall temperature of an inner wall of the rotary drum of the rotary tubular furnace may be up to 1200° C.

6. A method according to claim 1, wherein one of the combustible gas and the refuse coke is used outside a plant for generation of energy.

7. A method according to claim 1, wherein one of the combustible gas and the refuse coke is used internally in a downstream stage for a generation of energy.

8. A method according to claim 1, wherein the liberation of the volatile constituents of the waste material is effected in a first part of the rotary drum of the rotary tubular furnace, and the refuse coke produced in the first part is acted on by the air enriched with oxygen in a second part of the rotary drum of the rotary tubular furnace in such a manner that the refuse coke is completely oxidized and the volatile combustible constituents of the waste material are at least partly oxidized, a resulting slag thereof being sintered or fused.

9. A method for a thermal treatment of waste material, the method comprising the steps of:

conveying and mixing a waste material through a combustion chamber which is in the form of a rotary drum of a rotary tubular furnace;

feeding a gaseous oxidizing agent, which contains at least 50% oxygen, in a radial direction of said rotary drum so as to act on the waste material along the rotary tubular furnace, wherein, above the waste material, the gaseous oxidizing agent and volatile combustible constituents of the waste material form flames the heat of which effects a liberation of additional volatile constituents of the waste material; and obtaining the waste material freed of the volatile constituents as refuse coke, and unburnt volatile constituents as combustible gas.

10. A method for a thermal treatment of waste material, the method comprising the steps of:

conveying and mixing a waste material through a combustion chamber which is in the form of a rotary drum of a rotary tubular furnace;

feeding a gaseous oxidizing agent, which comprises a flue gas with oxygen added, in a radial direction of said rotary drum so as to act on the waste material along the rotary tubular furnace, wherein, above the waste material, the gaseous oxidizing agent and volatile combustible constituents of the waste material form flames the heat of which effects a liberation of additional volatile constituents of the waste material; and obtaining the waste material freed of the volatile constituents as refuse coke, and unburnt volatile constituents as combustible gas.

11. A method according to claims 1, 9 or 10, wherein the thermally treated waste material and the flue gas leaves the rotary tubular furnace at the same side.

12. A method according to claims 1, 9 or 10, wherein the air/gaseous oxygen agent in the rotary tubular furnace flows out in the direction of the waste material.

13. A method according to claim 11, wherein the air/gaseous oxygen agent in the rotary tubular furnace flows out in the direction of the waste material.

14. An apparatus for a thermal treatment of waste material, the apparatus comprising:

a rotary tubular furnace include a rotary drum; and a tubular lance arranged in said rotary drum so as to project from an end face into the rotary drum, said tubular lance comprising a plurality of individually controllable nozzles which supply air enriched with oxygen in a radial direction of said rotary drum, said outlet apertures being distributed over a length of the tubular lance.

15. An apparatus according to claim 14, wherein the nozzles are arranged at regular intervals.

16. An apparatus according to claim 14, wherein the tubular lance extends over an entire length of the rotary drum of the rotary tubular furnace.

17. An apparatus according to claim 14, wherein the gaseous oxidizing agent acts on the waste material in the rotary drum, such that the gaseous oxidizing agent and volatile combustible constituents of the waste material form flames whose heat effects a liberation of additional volatile constituents of the waste material.

18. An apparatus according to claim 17, wherein the tubular lance extends over a first part of the rotary drum of the rotary tubular furnace, in which first part the liberation of the volatile combustible constituents takes place, and an opening is arranged at a free end of the tubular lance to bring oxidizing agent to act on the waste material.

19. An apparatus according to claim 14, wherein the tubular lance is arranged in a top region of the rotary drum of the rotary tubular furnace.

20. An apparatus according to claim 14, wherein an inner wall of the rotary drum of the rotary tubular furnace has a refractory lining and is insulated.

21. An apparatus according to claim 14, wherein the tubular lance is cooled.

* * * * *